(12) United States Patent
Polocoser et al.

(10) Patent No.: US 9,744,945 B2
(45) Date of Patent: Aug. 29, 2017

(54) END CAP FOR RETAINING WIPING ELEMENT OF WIPER ASSEMBLY

(71) Applicant: TRICO PRODUCTS CORPORATION, Rochester Hills, MI (US)

(72) Inventors: Mitica Polocoser, Wayne, MI (US); Kyle Moll, Oxford, MI (US); Andrew Ehde, Oxford, MI (US)

(73) Assignee: Trico Products Corporation, Rochester Hills, MI (US)

( * ) Notice: Subject to any disclaimer, the term of this patent is extended or adjusted under 35 U.S.C. 154(b) by 182 days.

(21) Appl. No.: 14/094,831

(22) Filed: Dec. 3, 2013

(65) Prior Publication Data

US 2015/0151716 A1 Jun. 4, 2015

(51) Int. Cl.
*B60S 1/38* (2006.01)

(52) U.S. Cl.
CPC ........... *B60S 1/3893* (2013.01); *B60S 1/3889* (2013.01); *Y10T 403/57* (2015.01)

(58) Field of Classification Search
CPC .... B60S 1/3893; B60S 1/3889; B60S 1/3891; B60S 1/3886; B60S 1/3894; B60S 1/3896
USPC ........ 15/250.201, 250.32, 250.452, 250.451, 15/250.453, 250.454
See application file for complete search history.

(56) References Cited

U.S. PATENT DOCUMENTS

| | | | |
|---|---|---|---|
| 7,647,669 B2 * | 1/2010 | Chen | B60S 1/38 15/250.361 |
| 8,020,246 B2 | 9/2011 | Bauer et al. | |
| 8,196,252 B2 | 6/2012 | Henin | |
| 8,307,494 B2 | 11/2012 | Boland | |
| 8,327,500 B2 | 12/2012 | De Block et al. | |
| 8,341,801 B2 | 1/2013 | Coos | |
| 8,402,593 B2 | 3/2013 | Boland | |
| 2004/0200026 A1* | 10/2004 | Shanmugham | B60S 1/3801 15/250.452 |
| 2006/0107485 A1* | 5/2006 | Kim | B60S 1/38 15/250.201 |
| 2007/0174989 A1 | 8/2007 | Moll et al. | |
| 2007/0204422 A1* | 9/2007 | Machida | B60S 1/38 15/250.43 |
| 2008/0098559 A1* | 5/2008 | Machida | B60S 1/3801 15/250.201 |

(Continued)

FOREIGN PATENT DOCUMENTS

JP 2007216735 A 8/2007
JP 2007313908 A 12/2007

(Continued)

OTHER PUBLICATIONS

Mar. 13, 2015 International Search Report and Written Opinion for PCT/US2014/068276.

(Continued)

*Primary Examiner* — Andrew A Horton
(74) *Attorney, Agent, or Firm* — Miller Canfield (57) ABSTRACT

An end cap for retaining a wiping element of a wiper assembly includes a body adapted to be disposed over a portion of a wiping element of the wiper assembly and the body includes at least one tab adapted to be disposed in at least one notch of the wiping element of the wiper assembly to retain the wiping element from longitudinal movement relative thereto.

10 Claims, 10 Drawing Sheets

(56) References Cited

U.S. PATENT DOCUMENTS

| | | | |
|---|---|---|---|
| 2008/0222833 A1 | 9/2008 | Henin et al. | |
| 2008/0313843 A1 | 12/2008 | Chou | |
| 2010/0037417 A1 | 2/2010 | Moll et al. | |
| 2010/0139026 A1 | 6/2010 | Ku | |
| 2010/0257687 A1 | 10/2010 | Huang | |
| 2010/0325829 A1* | 12/2010 | Op't Roodt | B60S 1/3858 15/250.32 |
| 2011/0047741 A1* | 3/2011 | Avsar | B60S 1/3893 15/250.32 |
| 2012/0124767 A1 | 5/2012 | Thielen et al. | |
| 2012/0311807 A1* | 12/2012 | Criel | B60S 1/3891 15/250.15 |

FOREIGN PATENT DOCUMENTS

| | | |
|---|---|---|
| KR | 2020090007292 U | 7/2009 |
| KR | 101212283 B1 | 12/2012 |
| WO | 2007122569 A2 | 11/2007 |
| WO | 2009115408 A1 | 9/2009 |

OTHER PUBLICATIONS

Jul. 26, 2012 International Search Report and Written Opinion for PCT/US2011/061827.

\* cited by examiner

END CAP FOR RETAINING WIPING ELEMENT OF WIPER ASSEMBLY

BACKGROUND OF THE INVENTION

1. Field of the Invention

The present invention relates generally to wiper assemblies for vehicles and, more specifically, to an end cap for retaining a wiping element of a wiper assembly.

2. Description of the Related Art

Conventional wiper systems for vehicles known in the related art include some type of wiper assembly mounted to a wiper arm which, in turn, is mounted adjacent a surface to be wiped such as a windshield of the vehicle and pivotally driven to impart reciprocal motion to the wiper assembly across the windshield. The wiper assembly typically includes a rubber wiping element that contacts the windshield across the surface to be wiped. The wiper assembly often incorporates one or more metal strips that act to reinforce the wiping element and facilitate wiping contact by the wiping element across what is typically a curved glass surface. In this context, the wiper arm delivers a downward force to the wiper assembly that is distributed thereacross pressing the wiper assembly into contact with the windshield. The wiper assembly may also include an airfoil and a pair of end caps located at the distal ends of the wiper assembly. The wiper assembly may also include a coupler that connects the wiper assembly to the wiper arm.

Current technology of wiper assemblies utilizes one of three methods for attaching components of a wiper assembly together. These components include a wiping element, support member, airfoil, and coupler. The first method includes bonding the wiping element to a single support member and attaching an airfoil. The second method includes sandwiching the wiping element between a set of support members which are held together by end caps. The third method includes carrying the wiper element by a channel in the airfoil with a support member that feeds through the airfoil and a channel in the coupler, the system being then held together with end caps to prevent the support member from sliding out of the airfoil.

In the methods above, it is desired to retain the wiping element from longitudinal movement once assembled in the wiper assembly. It is also desired to retain the wiping element from longitudinal movement to improve wiper assembly to wiper assembly clearance. Therefore, there is a need in the art for retaining the wiping element of a wiper assembly from longitudinal movement once the wiper assembly is assembled together.

SUMMARY OF THE INVENTION

The present invention overcomes the disadvantages in the related art in an end cap for retaining a wiping element of a wiper assembly from longitudinal movement. The end cap includes a body adapted to be disposed over a portion of a wiping element of the wiper assembly and the body includes at least one tab adapted to be disposed in at least one notch of the wiping element of the wiper assembly to retain the wiping element from longitudinal movement relative thereto.

In addition, the present invention is a wiper assembly including a wiping element adapted to contact a surface to be wiped and having at least one notch extending therein. The wiper assembly also includes at least one elongated support member acting to support the wiping element. The wiper assembly further includes a pair of end caps operatively mounted to longitudinal ends of the at least one elongated support member and an airfoil operatively mounted to the at least one elongated support member and extending between the end caps. The wiper assembly further includes a coupler to couple the at least one elongated support member to a wiper arm. The wiper assembly still further includes a retaining member extending therefrom to be disposed in the at least one notch of the wiping element to retain the wiping element from longitudinal movement.

In this way, the end cap of the present invention retains the wiping element of the wiper assembly from longitudinal movement. The end cap of the present invention has a retaining member in the form of at least one tab that mates with at least one notch on the wiping element to retain the wiping element from longitudinal movement. In addition, the wiping element could also be retained by the tab on a coupler, airfoil, support member, etc. of the wiping assembly. The end cap and wiping element of the present invention can be used on current wiping assemblies or on future wiping assemblies. The present invention retains the wiping element from longitudinal movement for customer and governmental regulations. The present invention improves wiper assembly to wiper assembly clearance. The present invention also improves wiper assembly to A-pillar clearance. The present invention can be used for wiper systems in any type of transportation from automotive vehicles, heavy-duty trucks, trains, air planes, ships, large construction vehicles, or military vehicles or any other type of vehicles that contain surface wiper systems.

Other objects, features, and advantages of the present invention will be readily appreciated as the same becomes better understood after reading the subsequent description taken in connection with the accompanying drawings.

DETAILED DESCRIPTION OF THE PREFERRED EMBODIMENT(S)

Figure 1:
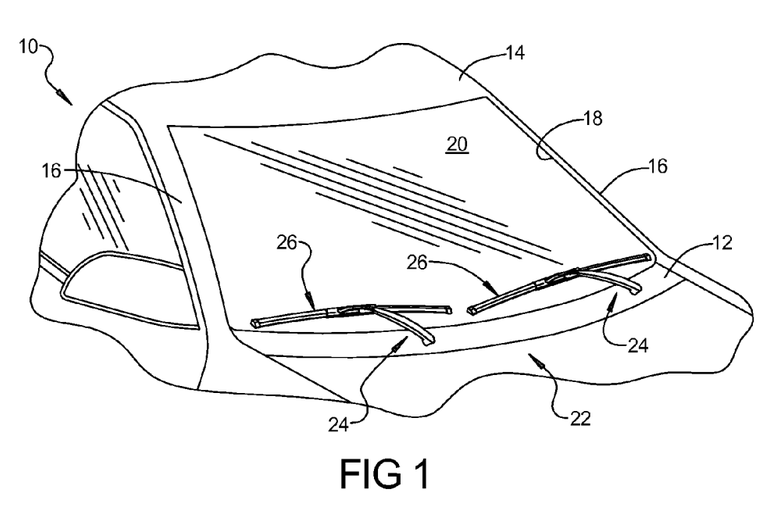
FIG. 1 is a partial perspective view of a front of a vehicle having a pair of wiper assemblies, according to one embodiment of the present invention, pivotally mounted for reciprocal movement across a windshield of the vehicle.

Referring now to the figures, where like numerals are used to designate like structure, a portion of a vehicle is schematically illustrated at 10 in FIG. 1. The vehicle 10 includes a cowl 12, a roof 14, and a pair of laterally spaced front or "A" pillars 16 extending between the roof 14 and the cowl 12. The A-pillars 16, roof 14, and cowl 12 cooperate to define a generally rectangular opening 18 in which is supported a curved or "swept back" glass windshield 20. As illustrated, the vehicle 10 is an automotive vehicle, but may be any type of vehicle such as heavy-duty trucks, trains, air planes, ships, large construction vehicles, or military vehicles or any other type of vehicle that contain surface wiper systems.

A wiper system is generally indicated at 22 in FIG. 1 and is employed to clean the windshield 20. The wiper system 22 includes a pair of wiper arms, generally indicated at 24, and a pair of wiper assemblies, according to the present invention and generally indicated at 26, which correspond to the driver and passenger side of the vehicle 10. However, those having ordinary skill in the art will appreciate that the wiper system 22 could employ a single wiper arm 24 and a single wiper assembly 26 without departing from the scope of the present invention.

Figure 2:
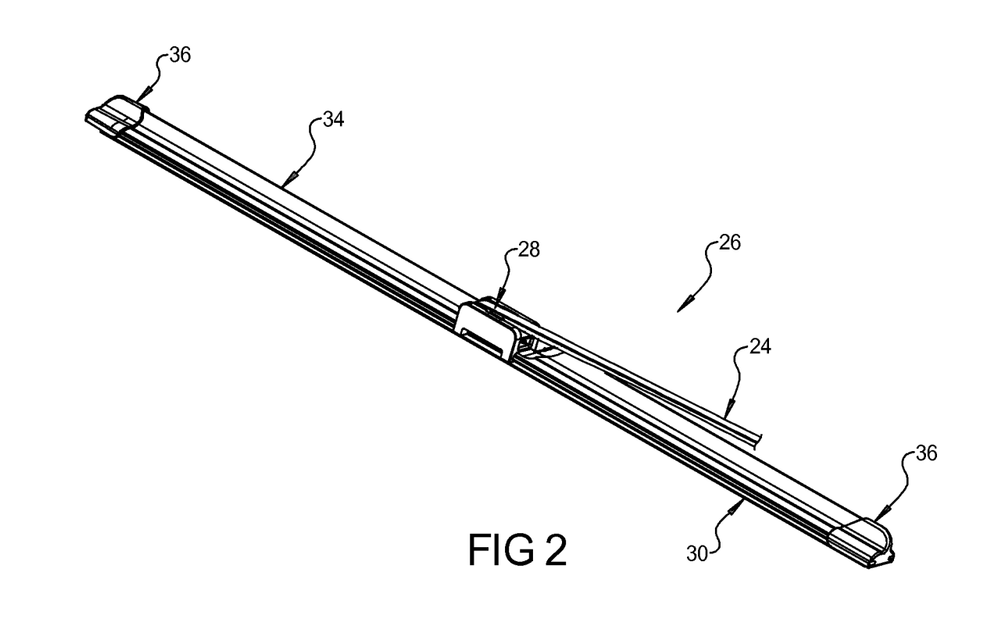
FIG. 2 is an enlarged perspective view of one of the wiper assemblies, according to one embodiment of the present invention, of FIG. 1.

In the representative example illustrated in FIGS. 1 and 2, each wiper assembly 26 is carried by a corresponding wiper arm 24. In addition, the wiper assembly 26 includes a coupler, generally indicated at 28, that acts to connect the wiper assembly 26 to the wiper arm 24. The wiper system 22 also includes an electrical motor (not shown, but generally known in the art) to move the wiper assemblies 26 in an oscillating manner across the surface of the windshield 20.

While the wiper assembly 26 illustrated in FIG. 1 is shown in connection with the front windshield 20 of the vehicle 10, those having ordinary skill in the art will appreciate that wiper assemblies 26 may be employed in other areas of the vehicle 10, such as a rear window (not shown) or a head lamp (not shown) that employs a wiper system. Thus, it will be understood that the present invention is not limited for use solely in connection with wiper arms 24 adapted for use on a vehicle's windshield 20, but for use in all applications where wiper arms 24 are employed.

Figure 3:
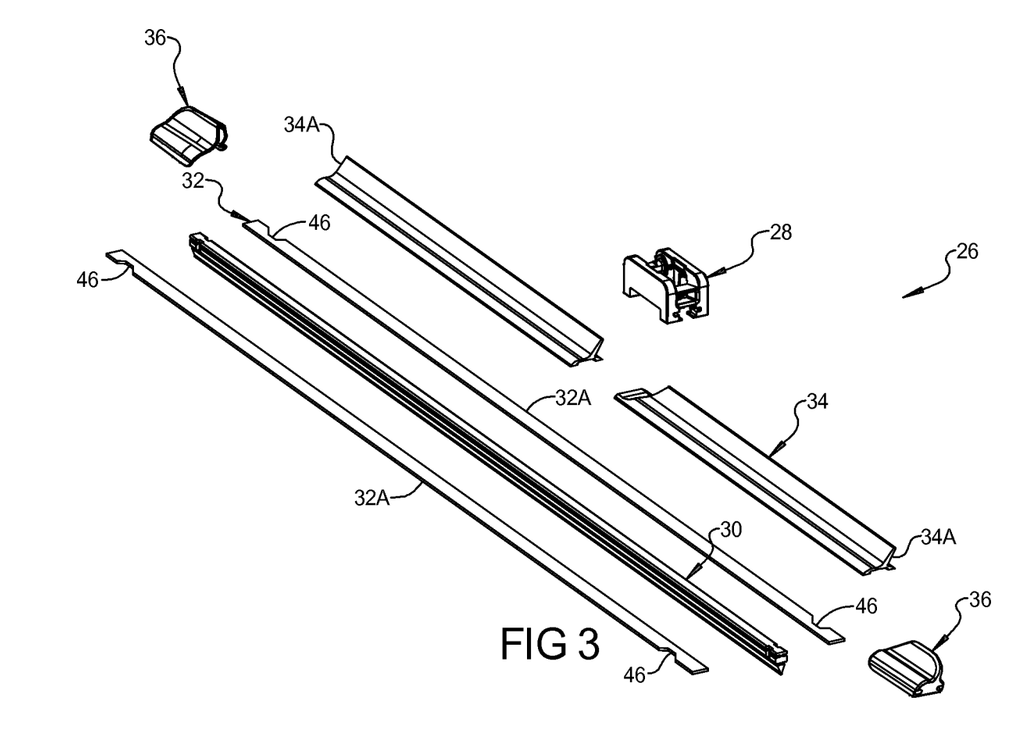
FIG. 3 is an exploded perspective view of the wiper assembly, according to one embodiment of the present invention, of FIG. 2.

Referring to FIGS. 2 and 3, the wiper assembly 26 includes a wiping element, generally indicated at 30, that is adapted to contact the surface of the vehicle 10 to be wiped, in this representative example, the windshield 20. The wiper assembly 26 also includes at least one support member, generally indicated at 32, that defines a longitudinal axis and that acts to reinforce or support the wiping element 30. In the representative embodiment illustrated herein, the support member 32 is a pair of splines 32A to operatively reinforce or support the wiping element 30. However, those having ordinary skill in the art will appreciate from the description that follows that the support member 32 may be either a monolithic beam or defined by the pair of splines 32A. The wiper assembly 26 may also include an airfoil, generally indicated at 34, to prevent the wiper assembly 26 from lifting from the surface of the windshield 20. The wiper assembly 26 also includes one or more end caps, generally indicated at 36 and according to one embodiment of the present invention. Each of the above components will be described in greater detail below.

As illustrated in FIGS. 4 through 11, the wiping element 30 includes an upper section or portion 38 and a lower section or portion 40 that are partitioned by a longitudinally extending bridge or hinge section or portion 42. The hinge portion 42 provides flexibility between the upper portion 38 and lower portion 40 during operational movement of the wiper assembly 26 across the surface to be wiped. In the embodiment illustrated, the upper section 42 includes opposed grooves 43 extending laterally therein and longitudinally therealong between its ends. The grooves 43 receive the splines 32A and cooperate with the end caps 36 as will be described in detail below. The upper section 42 also includes one or more notches 44 extending therein. In the embodiment illustrated, the notches 44 are located near the longitudinal ends of the wiping element 30. One notch 44 extends laterally into each side of the wiping element 30 such that the notches 44 oppose each other. The notches 44 are generally rectangular in shape, but may be any suitable shape. The notches 44 cooperate with the end caps 36 as will be described in detail below. The wiping element 30 also includes a predetermined length corresponding to particular application and is often manufactured through an extrusion process, which enables the length of the wiping element 30 to be easily adjusted without a substantial increase to manufacturing expense. Furthermore, while the wiping element 30 of the present invention is constructed from a flexible rubber, those having ordinary skill in the art will appreciate that it may be constructed from any flexible material such as silicone or other polymer without departing from the scope of the present invention.

The support member 32 may be constructed from a resiliently flexible material, such as spring steel or a polymer, and is adapted to apply force from an intermediate position between its longitudinal ends. More specifically, the support member 32 receives force from the spring-loaded wiper arm 24 at an intermediate position and distributes this force across the span of the support member 32 toward its longitudinal ends. To that end, the support member 32 may be curved longitudinally with a predetermined radius of curvature. This predetermined radius of curvature is sometimes referred to in the related art as a "free form" radius of curvature. Accordingly, the curvature of the support member 32 may be symmetrical or asymmetrical depending on the force requirements and the contour of the windshield 20. The flexible, free form, pre-curved support member 32 straightens out when the wiper arm 24 applies a force thereto to flatten the support member 32 and directs the wiping element 30 to contact the windshield 20. Thus, the elongated support member 32 includes a free-form curvature that ensures force distribution on windshields having various curvatures and that effects proper wrapping about the windshield 20.

As illustrated throughout the figures, the support member 32 has a substantially constant width and may have a constant thickness throughout the length between its longitudinal ends. The constant width and thickness are adapted to provide high lateral and torsional stiffness to avoid lateral and torsional deflection, which causes the wiping element 30 to stick/slip ("chatter") on the windshield 20 during operation. Thus, the cross-section of the support member 32 has a generally rectangular outer profile that makes the support member 32 easier to manufacture. More specifically, where the support member 32 is constructed from metal, such as spring steel, the tools and machinery used to manufacture the support member 32 are less complicated than that required to manufacture having varying widths and/or thicknesses. Furthermore, where the support member 32 is constructed from a polymer, such as a thermoplastic elastomer, the tools and extrusion process machinery are also less complicated than those employed to manufacture beams having varying widths and/or thicknesses. However, those having ordinary skill in the art will appreciate that the support member 32 illustrated herein may include a varying thickness and/or width without departing from the scope of the present invention.

Figure 4:
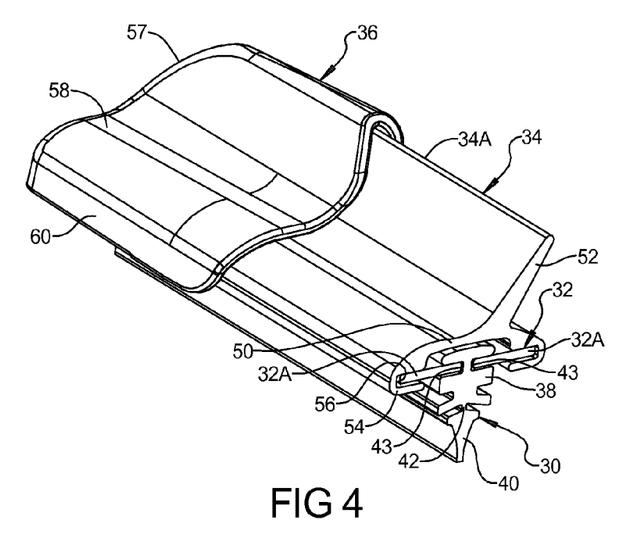
FIG. 4 is an enlarged perspective view of a portion of the wiper assembly, according to one embodiment of the present invention, of FIG. 2.
Figure 5:
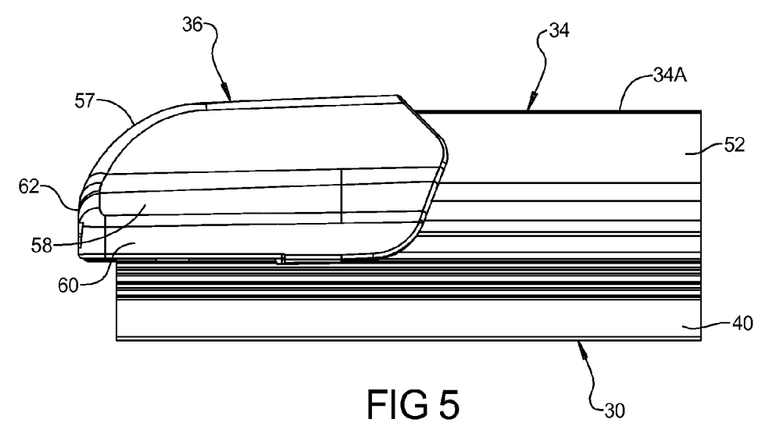
FIG. 5 is an enlarged side view of a portion of the wiper assembly, according to one embodiment of the present invention, of FIG. 2.
Figure 6:
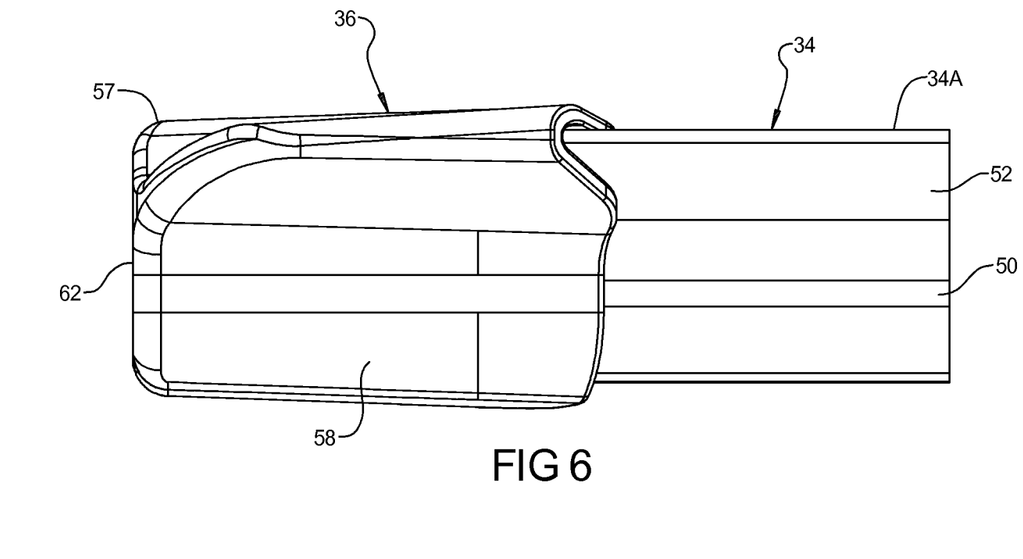
FIG. 6 is an enlarged top view of a portion of the wiper assembly, according to one embodiment of the present invention, of FIG. 2.
Figure 7:
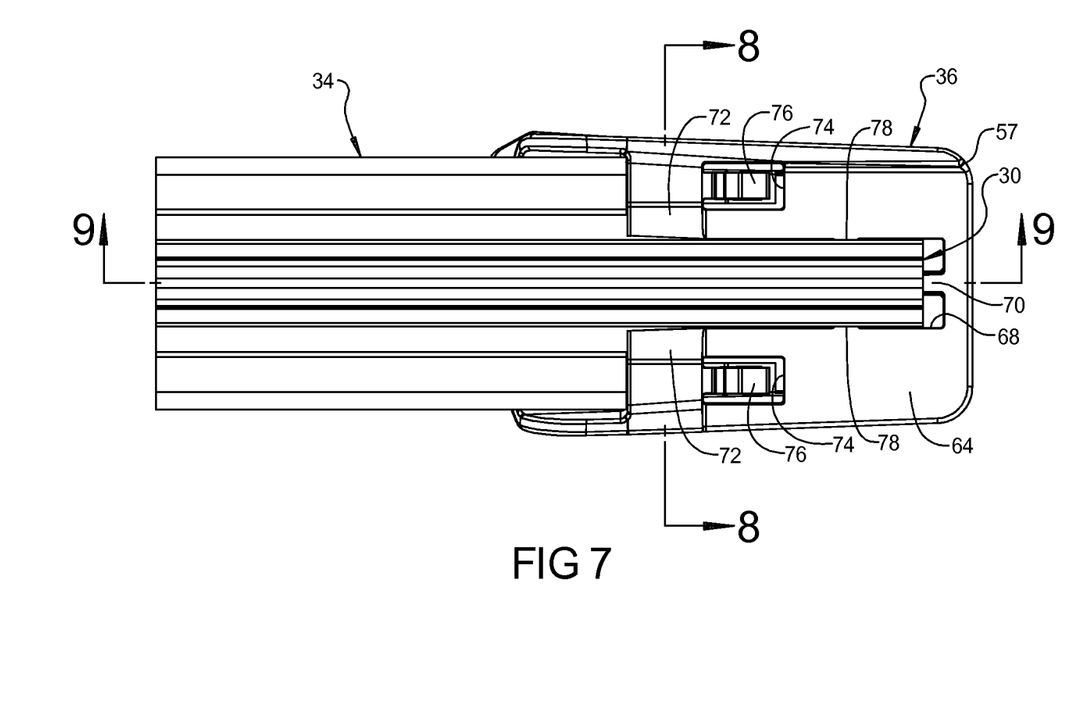
FIG. 7 is an enlarged bottom view of a portion of the wiper assembly, according to one embodiment of the present invention, of FIG. 2.
Figure 8:
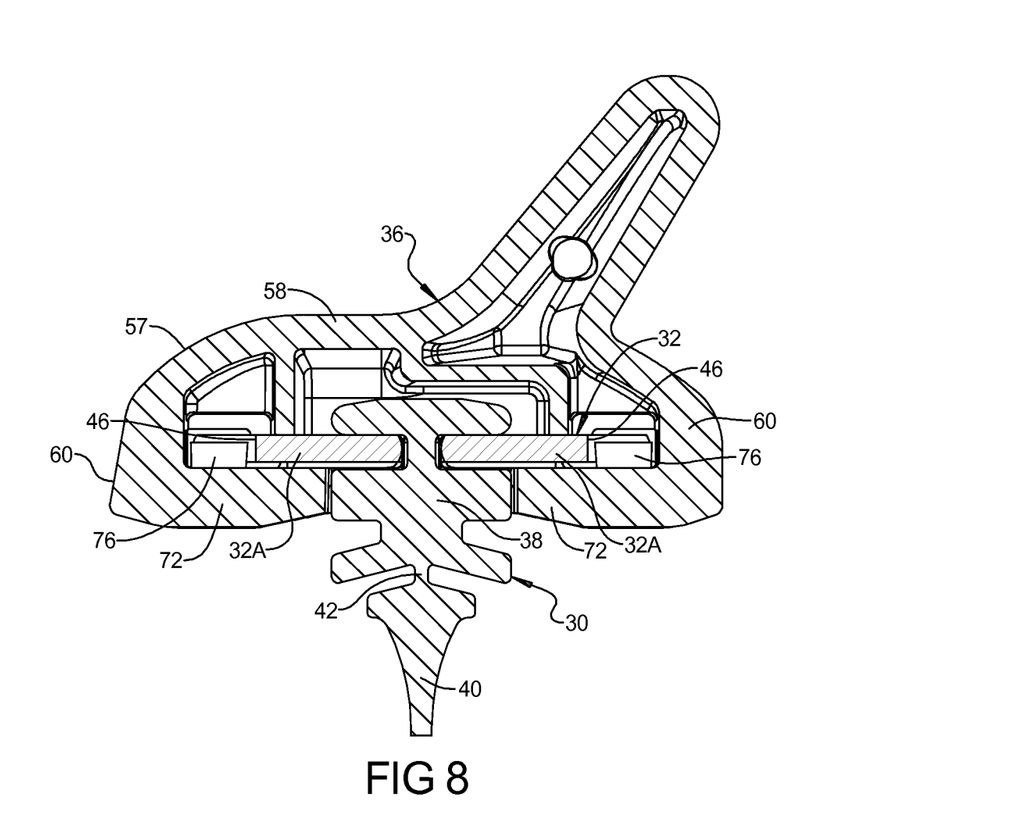
FIG. 8 is a sectional view taken along lines 8-8 of FIG. 7.
Figure 9:
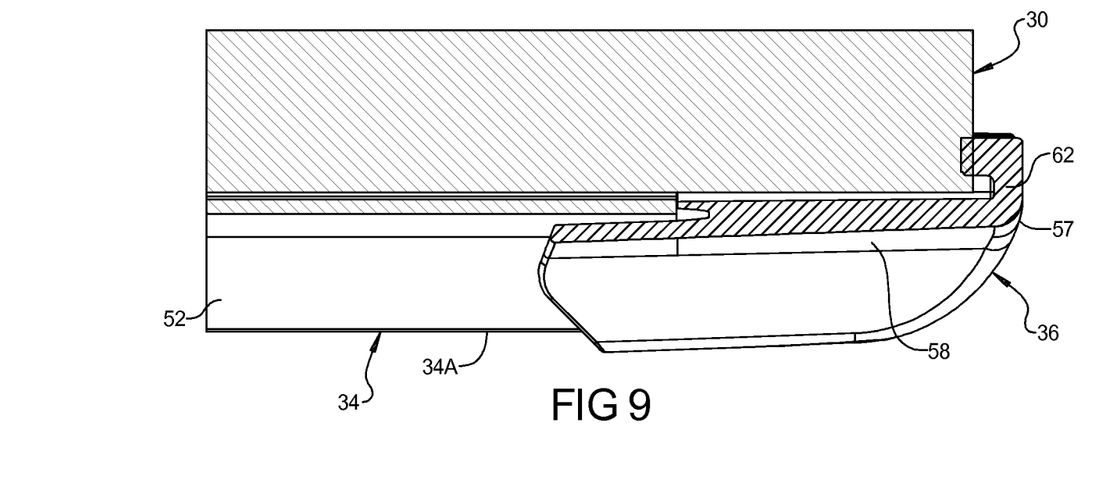
FIG. 9 is a sectional view taken along lines 9-9 of FIG. 7.

Additionally, as illustrated in FIGS. 3 and 4, the splines 32A of the support member 32 are disposed in the grooves 43 of the wiping element 30. The support member 32 may include one or more notches 46 extending therein. In the embodiment illustrated, the notches 46 are located near the longitudinal ends of the support member 32. One notch 46 extends into each side of the support member 32 such that the notches 46 oppose each other. The notches 46 are generally rectangular in shape, but may be any suitable shape. The notches 46 cooperate with the end caps 36 as will be described in detail below.

As noted above, the wiper assembly 26 also includes a coupler, generally indicated at 28. The coupler 28 is adapted to connect the wiper assembly 26 to the wiper arm 24. More specifically, those having ordinary skill in the art will appreciate that different OEM's employ wiper arm assemblies having different attachment members (not shown) adapted to operatively engage a specific wiper assembly. Accordingly, the coupler 28 illustrated herein includes structure that operatively engages at least one or more of these different attachment members (not shown). Further by way of example, certain wiper arms employed by OEM's include "bayonet-style"; "pin-type"; or "hook-type" attachment members of various sizes that operatively engage the wiper assemblies.

As previously noted, the wiper assembly 26 includes the airfoil, generally indicated at 34, to prevent the wiping assembly 26 from lifting from the surface of the windshield 20. The airfoil 34 is operatively mounted to the wiping element 30 and the support member 32. The airfoil 34 extends along the length of the wiping element 30 and the support member 32 between the end caps 36. The airfoil 34 acts to reduce the likelihood of wind lift by allowing air to flow over the wiper assembly 26. More specifically, and in the embodiment illustrated herein, the airfoil 34 includes a pair of airfoil components 34A that is operatively mounted to the wiping element 30 and the support member 32 with the coupler 28 extending therebetween and the end caps 36 at each longitudinal end. However, those having ordinary skill in the art will appreciate that the airfoil 34 may be defined as a single unitary component by without departing from the scope of the present invention.

Referring again to FIGS. 4 through 9, the airfoil 34 includes a body 50 extending longitudinally. The airfoil 34 includes a spoiler 52 that tapers outwardly from the body 50 toward a terminal point to define a profile that is slightly contoured. The airfoil 34 includes channel members 54 extending downwardly from the body 50 opposite the spoiler 52. The channel members 54 are generally "C" shaped to form a channel 56 to receive the support member 32. The airfoil 34 is made of a suitable material such as plastic or an elastomer. In addition, the airfoil 34 may be manufactured through an extrusion process. However, those having ordinary skill in the art will appreciate that the airfoil 34 may be manufactured using any other conventional mechanism.

Referring to FIGS. 4 through 11, the wiper assembly 26 further includes the pair of end caps, generally indicated at 36 and according to one embodiment of the present invention. The end caps 36 are adapted to be disposed adjacent to the distal ends of the airfoil 34. The end caps 36 are secured to the support member 32. The end caps 36 include a profile that substantially mimics the contours of the airfoil 34 to maintain the wind lift characteristics of the wiper assembly 26 and to provide an increased aesthetic value. The end caps 36 also provide a mass increase adjacent the distal ends of the airfoil 34 that prevent localized chatter along the extremities of the wiping element 30 caused by the combination of wind lift and a decrease in the force distributed to this area from wiper arm 24 via the splines 32A, as above-described.

The end caps 36 each have a body 57 with a top wall 58, side walls 60, end wall 62, and a bottom wall 64 forming a cavity 66 extending longitudinally inwardly from one end surface 74 to receive the longitudinal end of the wiping element 30 and support member 32. The end caps 36 each have a slot 68 extending longitudinally in the bottom wall 64 and communicating with the cavity 66. The end caps 36 each have a projection 70 at the longitudinal end of the slot 68 to act as a stop for the end of the wiping element 30. The end caps 36 each have a pair of opposed flanges 72 extending inwardly from the side walls 60 and adapted to be received in the grooves of the wiping element 30. The end caps 36 each have a pair of apertures 74 spaced laterally and extending through the bottom wall 64 and a pair of locking arms 76 extending from the flanges 72 and into the apertures 74. It should be appreciated that the locking arms 76 are cantilevered to the flanges 72 and can be deflected relative to the flanges 72 to be disposed in the notches 46 of the splines 32A to secure the end caps 36 to the support member 32.

Figure 10:
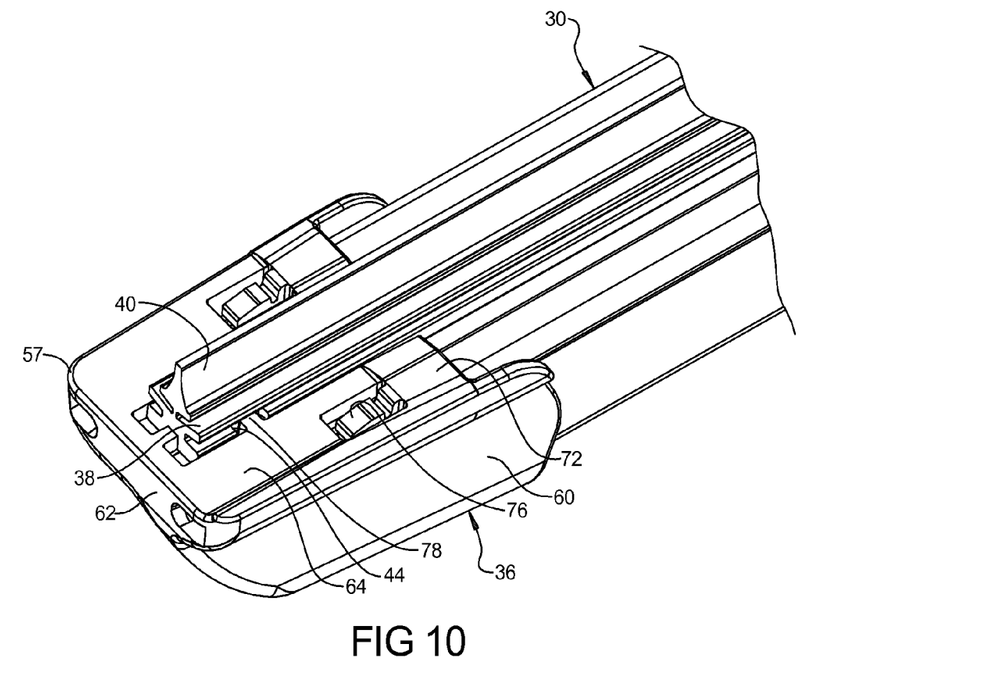
FIG. 10 is a perspective view of an end cap, according to one embodiment of the present invention, and a portion of a wiping element of the wiper assembly of FIG. 2.
Figure 11:
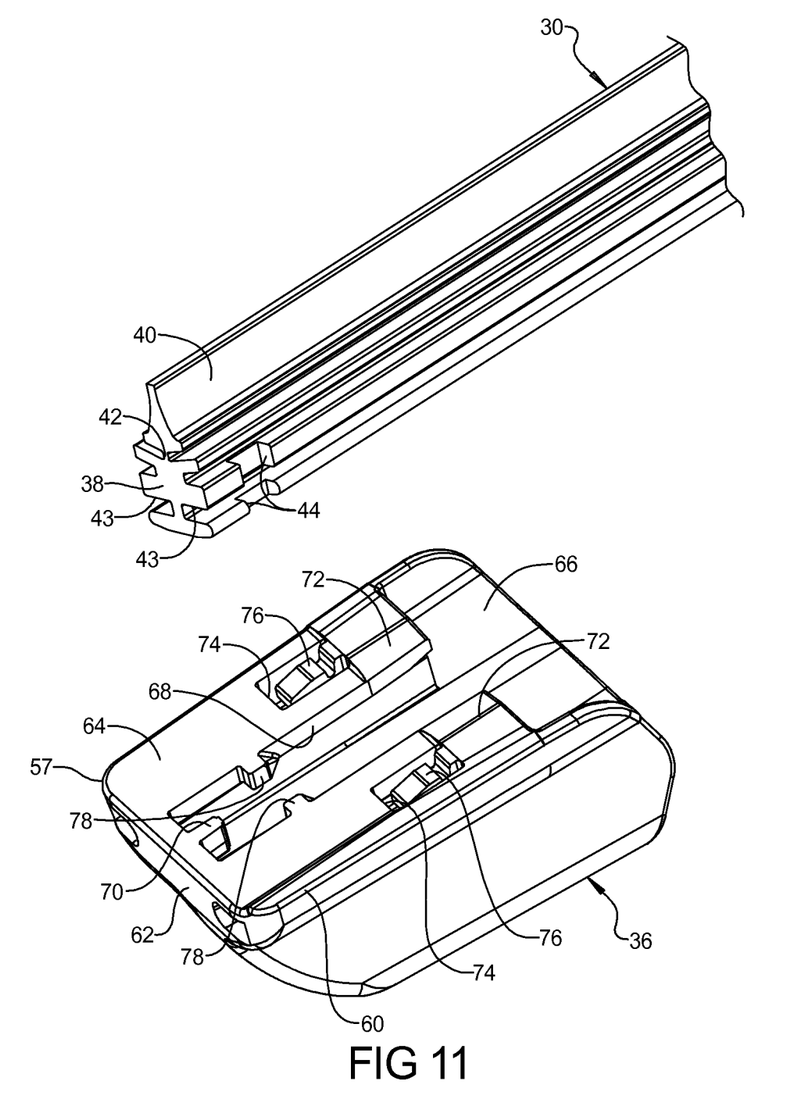
FIG. 11 is an exploded perspective view of an end cap, according to one embodiment of the present invention, and a portion of a wiping element of the wiper assembly of FIG. 2.

The end caps 36 each have a retainer member to retain the wiping element 30 from longitudinal movement. In the embodiment illustrated, the retainer member is a pair of opposed tabs or projections 78 extending inwardly from the sides of the slot 68 and spaced longitudinally from the projection 70. The tabs 78 are disposed in the notches 44 of the wiping element 30 to prevent longitudinal movement of the wiping element 30. The end cap 36 is a hollow piece made of a material such as plastic. The end cap 36 is integral, unitary, and one-piece. It should be appreciated that the wiping element 30 flexes to allow the tabs 78 to be disposed in the notches 44 when the end caps 36 are pressed longitudinally onto the wiper assembly 26.

In operation, the wiper assembly 26 is assembled by sliding the support member 32 into the wiping element 30. The coupler 28 is slid onto the support member 32 and the airfoil 34 is slid onto the support member 32. The end cap 36 is slid onto each end of the support member 32 and the support member 32 deflects the locking arms 76. The end cap 36 continues to slide until the locking arms 76 are disposed in the notches 46 in the support member 32. Simultaneously, the tabs 78 deflect the wiping element 30 until the tabs 78 are aligned with the notches 44 of the wiping element 30. Once aligned, the tabs 78 are disposed in the notches 44 of the wiping element 30 to lock the wiping element 30 and end cap 36 together. It should be appreciated that the wiping element 30 is retained from longitudinal movement by the end cap 36 due to the tabs 78 being disposed in the notches 44 of the wiping element 30.

The present invention has been described in an illustrative manner. It is to be understood that the terminology which has been used is intended to be in the nature of words of description rather than of limitation. Many modifications and variations of the present invention are possible in light of the above teachings. Therefore, within the scope of the appended claims, the present invention may be practiced other than as specifically described.

What is claimed is:

1. A wiper assembly comprising:
a wiping element elongated in a longitudinal direction, adapted to contact a surface to be wiped, and having opposing longitudinal end portions and opposing lateral sides with a pair of notches extending into each of said lateral sides adjacent to each of said end portions, the notches are formed on laterally outermost edges of the opposing lateral sides, the notches are laterally outermost from a lateral center of the wiping element and face in opposite lateral directions, and the lateral directions are perpendicular to the longitudinal direction;
a support member having longitudinal ends and acting to support said wiping element, and notches extending therein near the longitudinal ends;
an airfoil operatively mounted to said support member; and
end caps operatively mounted to said support member at longitudinal ends of said airfoil, said end caps each having a pair of tabs adapted to be disposed in said pair of notches of said respective end portions of said wiping element to retain said wiping element from longitudinal movement relative to said end caps, and said end caps each having a pair of locking arms to be disposed in the notches of the support member to secure the end caps to the support member.

2. A wiper assembly as set forth in claim 1 wherein said end caps each include a body adapted to be disposed over said respective end portions of said wiping element and said body including said pair of tabs.

3. A wiper assembly as set forth in claim 2 wherein said body includes a top wall, a pair of side walls, an end wall, and a bottom wall forming a cavity to receive said respective end portion of said wiping element, said bottom wall having a slot extending longitudinally therein to receive said respective end portion of said wiping element.

4. A wiper assembly as set forth in claim 3 wherein said tabs are disposed along said slot.

5. A wiper assembly as set forth in claim 4 wherein said tabs extend inwardly into said slot to form a space between said tabs.

6. A wiper assembly as set forth in claim 5 wherein said wiping a element comprises an upper portion, a lower portion, and a hinge portion partitioning said upper portion and said lower portion.

7. A wiper assembly as set forth in claim 6 wherein said upper portion includes opposed grooves extending laterally therein and longitudinally therealong between ends of the upper portion.

8. A wiper assembly as set forth in claim 7 wherein said upper portion includes said opposing lateral notches extending therein.

9. The wiper assembly of claim 7, wherein the support member is a pair of splines disposed in the grooves, one of the notches of the support member extending into each side of the splines such that the notches of the support member oppose each other.

10. The wiper assembly of claim 9, wherein the end caps each have a pair of opposed flanges extending inwardly from the side walls, and a pair of apertures spaced laterally and extending through the bottom wall and a pair of locking arms extending from the flanges into the apertures, and wherein the locking arms are to be disposed in the notches of the splines to secure the end cap to the support member.

* * * * *